United States Patent
Morgan

(10) Patent No.: US 6,607,660 B2
(45) Date of Patent: Aug. 19, 2003

(54) LIQUID FILTRATION DEVICE WITH BACKWASHING FEATURE

(76) Inventor: H. William Morgan, P.O. Box 735, Michigan City, IN (US) 46360

( * ) Notice: Subject to any disclaimer, the term of this patent is extended or adjusted under 35 U.S.C. 154(b) by 8 days.

(21) Appl. No.: 09/849,770

(22) Filed: May 4, 2001

(65) Prior Publication Data

US 2002/0162786 A1 Nov. 7, 2002

(51) Int. Cl.[7] .................. B01D 27/08; B01D 27/14; B01D 29/54; B01D 29/66
(52) U.S. Cl. ................. 210/108; 210/323.2; 210/333.1; 210/340; 210/497.01; 210/427
(58) Field of Search .................. 210/323.2, 330, 210/332–333.01, 333.1, 411, 409, 420, 427, 340, 345, 322, 323.1, 314, 497.01, 320, 390–393, 108

(56) References Cited

U.S. PATENT DOCUMENTS

| | | | | |
|---|---|---|---|---|
| 2,954,873 A | * | 10/1960 | Davis | 210/333.1 |
| 2,985,306 A | * | 5/1961 | Statzell | 210/130 |
| 3,280,979 A | * | 10/1966 | King | 210/108 |
| 3,280,980 A | * | 10/1966 | King | 210/108 |
| 4,781,825 A | * | 11/1988 | Grimes et al. | 210/107 |

* cited by examiner

Primary Examiner—Joseph Drodge
Assistant Examiner—Marianne Ocampo
(74) Attorney, Agent, or Firm—Botkin & Hall, LLP

(57) ABSTRACT

A liquid filtration device having a backwashing feature in which liquid flow through the device is reversed with a plate being rotated under the filtration cartridges to allow reverse liquid flow into the individual filtration cartridges to produce the backwashing action.

6 Claims, 7 Drawing Sheets

LIQUID FILTRATION DEVICE WITH BACKWASHING FEATURE

SUMMARY OF THE INVENTION

This invention relates to a liquid filter and will have particular application to a liquid filtration device having backwashing features.

The liquid filtration device described herein includes a plurality of cartridge filter elements which are angularly disposed within the filter housing, paralleling the direction of liquid flow through the filter. A floating plate is located across one end of the filtration cartridges which, during normal filtering operation of the filtration device, is spaced from the adjacent ends of the cartridges to allow normal liquid flow through the device. When it is desired to backwash to clean the filter, liquid flow is reversed through the filtration device with the floating plate being urged against the adjacent ends of the filtration cartridges and rotated to allow reverse flow of the liquid through individual filtration cartridges.

The filtration device of this invention would have use in the swimming pool industry, paper industry, and for other filtration uses in which reverse liquid flow through the filter can be instituted. As such, one of the purposes of this invention is to provide a liquid filtration device having back flow filter element cleaning characteristics which can be accomplished in a rapid and economical manner.

Still another object of this invention is to provide a simplified and easily operable filtration device having backwashing capabilities in which liquid filter cartridges are utilized.

Still other objects of this invention will become apparent upon a reading of the following description.

BRIEF DESCRIPTION OF THE DRAWINGS

A preferred embodiment of this invention has been chosen wherein.

DESCRIPTION OF THE PREFERRED EMBODIMENTS

Figure 1:
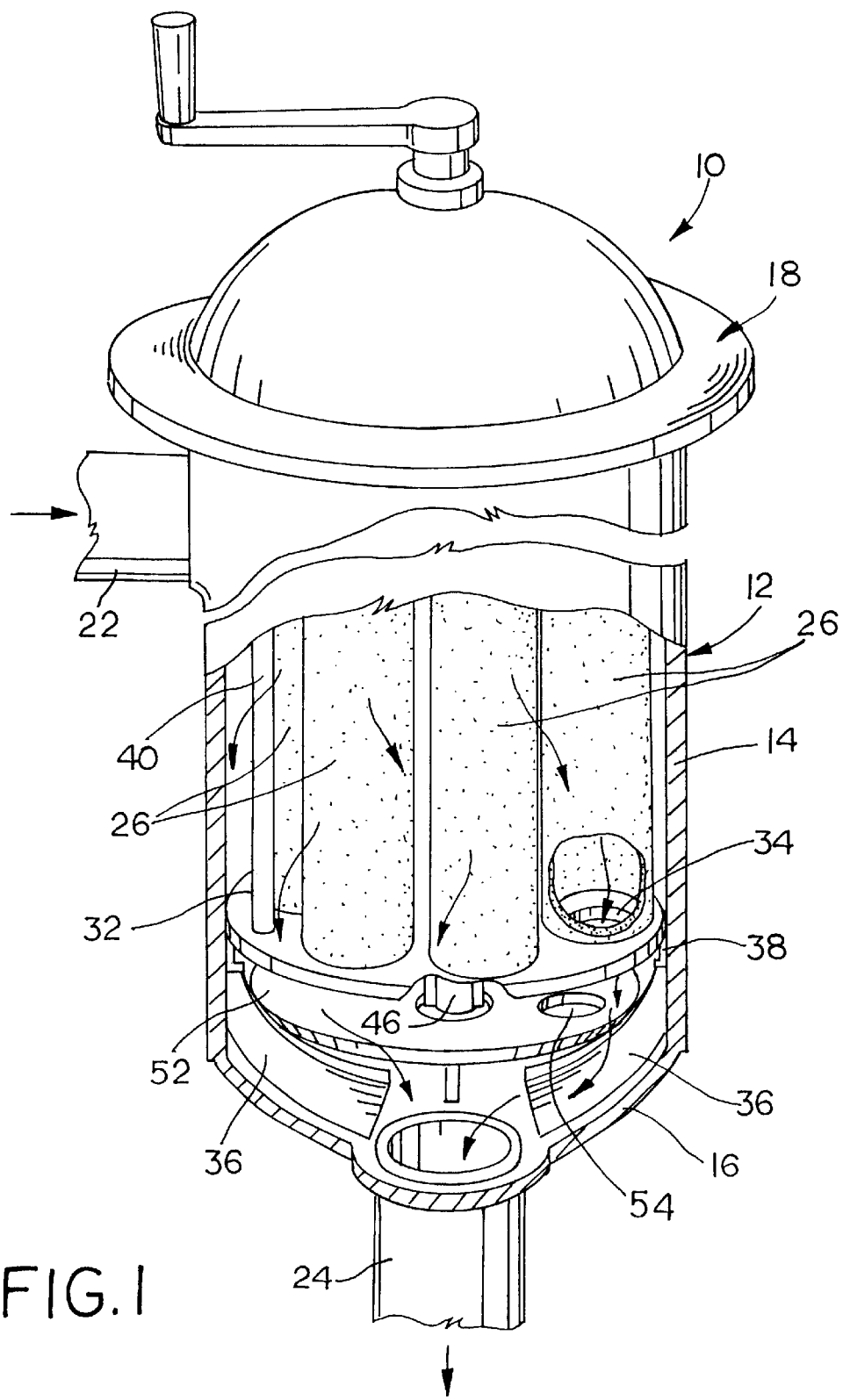
FIG. 1 is a perspective view of the filtration device having portions of the filter housing removed for illustrative purposes and showing a normal liquid flow through the device.

The preferred embodiments illustrated are not intended to be exhaustive or to limit the invention of precise form disclosed. They are chosen and described to best explain the invention and to enable one having an ordinary skill in the art to utilize the invention.

Filter or filtration device 10 of this invention includes a housing 12 having a sidewall 14 and a bottom wall 16. The upper end of housing 12 is open with its sidewall being spanned by a cover or top 18. Cover 18 is removably connected to housing 12 by clamps or a threaded interconnection as illustrated and sealed by an appropriate sealing ring 20 to the housing. An inlet port or conduit 22 is formed in housing sidewall 14 adjacent to the upper end of the housing and an outlet port or conduit 24 is formed in bottom wall 16 of the housing.

Located within housing 12 are a plurality of cartridge filters of the standard tubular form and formed of a filtering material such as spun polypropylene. Filter cartridges 26 allow for the passage of liquid through the sidewall of the cartridge in their normal and well known filtration manner. While the number of filter cartridges 26 may vary, in illustrative embodiment seven cartridges are utilized. Six of the cartridges are equal radially and equal angularly displaced about the central axis 28 of the housing and are retained in clamped fashion between an upper retainer plate 30 and a lower retainer plate 32. There is also a centrally located filter cartridge 26' which is coaxially located along axis 28 of the housing and secured between plates 30 and 32. Upper retainer plate 30 is of a solid plate construction thus sealing the upper ends of filter cartridges 26, 26'. Lower retainer plate 32 includes a plurality of equal radial, equal angular openings 34, each of which is aligned with the open center or bore 27 of the overlying filter cartridge 26.

Equally angularly disposed fins 36 are carried by housing bottom wall 16 about outlet port 24. Lower retainer plate 32 is positioned at its outer circumferential edge upon a support 38 so as to locate filter cartridges 26, 26' within the housing. Tie rods 40 extend between plates 30, 32 and serve to clamp the filter cartridges between the plates.

A shaft 42 extends from above cover 18 to adjacently above outlet port 24 and below lower retainer plate 32. A bearing and lock collar assembly 44 serves to seal shaft 42 where it protrudes through the center of cover 18 with the lock collar part of the assembly serving to secure the shaft against longitudinal movement relative to the top or cover. Shaft 42 is tubular and terminates in an open end below lower retainer plate 32. A key 46 is secured to the lower end of shaft 42 below lower retainer plate 32 so as to rotate with the shaft upon the turning of crank or handle 48 which is connected to the exposed upper end of the shaft above cover 18. Thus upon the rotation of handle 48 either manually or by motor, shaft 42 along with key 46 rotate relative to the retainer plates 30, 32 and the filter cartridges 26, 26'. A bearing washer 47 is located between key 46 and plate 32 to facilitate rotative movement of the key relative to the plate.

Shaft 42 includes a plurality of longitudinally spaced openings 50. During normal filtering liquid flow through filter 10, the liquid first enters inlet port 22 flowing around all filter cartridges 26, 26', passing through the cartridges in a filtering mode. The filtered liquid within cartridges 26 passes downwardly through the centers 27 of the cartridges, out the aligned openings 34 in the lower retainer plate 32 and out outlet port 24. The liquid passing through the center of cartridge 26' enters openings 50 in shaft 42 passing downwardly through the center of the tubular shaft and out its open lower end, exiting outlet port 24.

Figure 3:
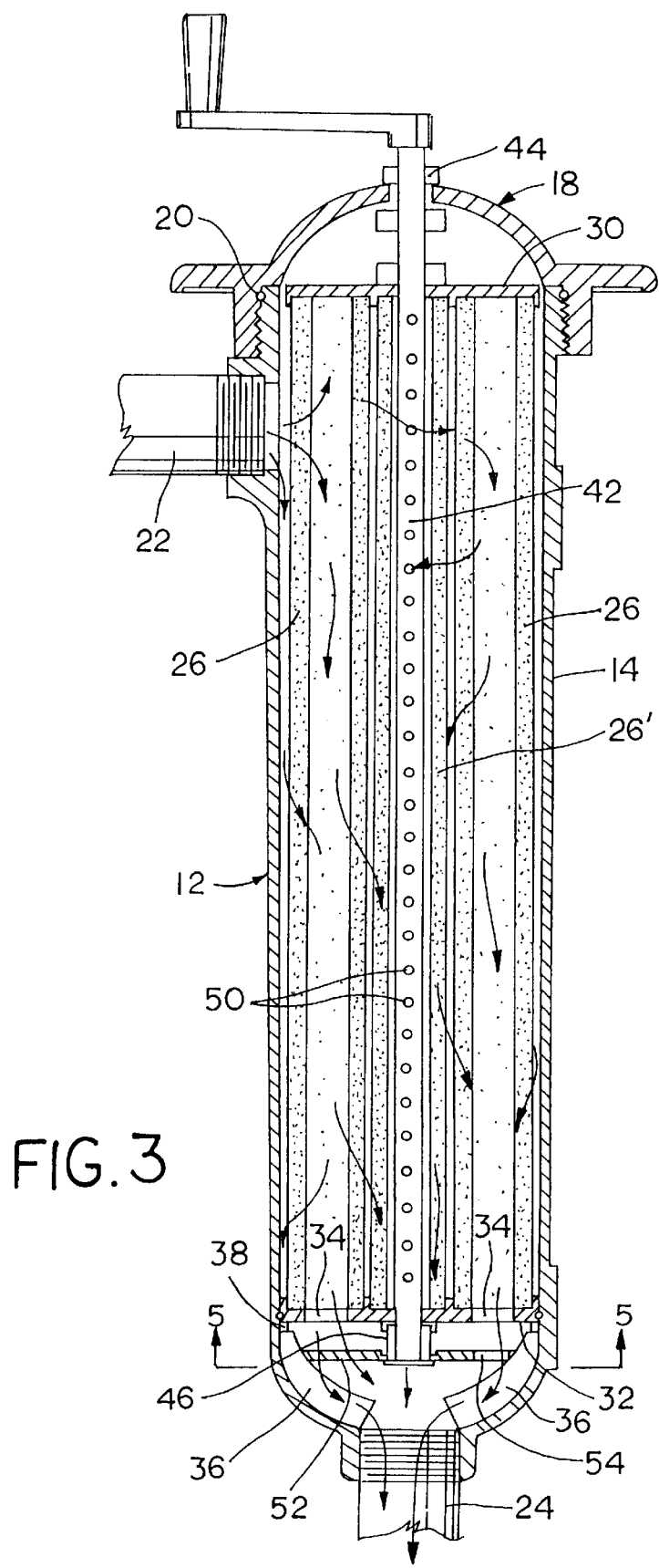
FIG. 3 is a longitudinal sectional view through the filtration device showing normal liquid filtering flow through the device.
Figure 4:
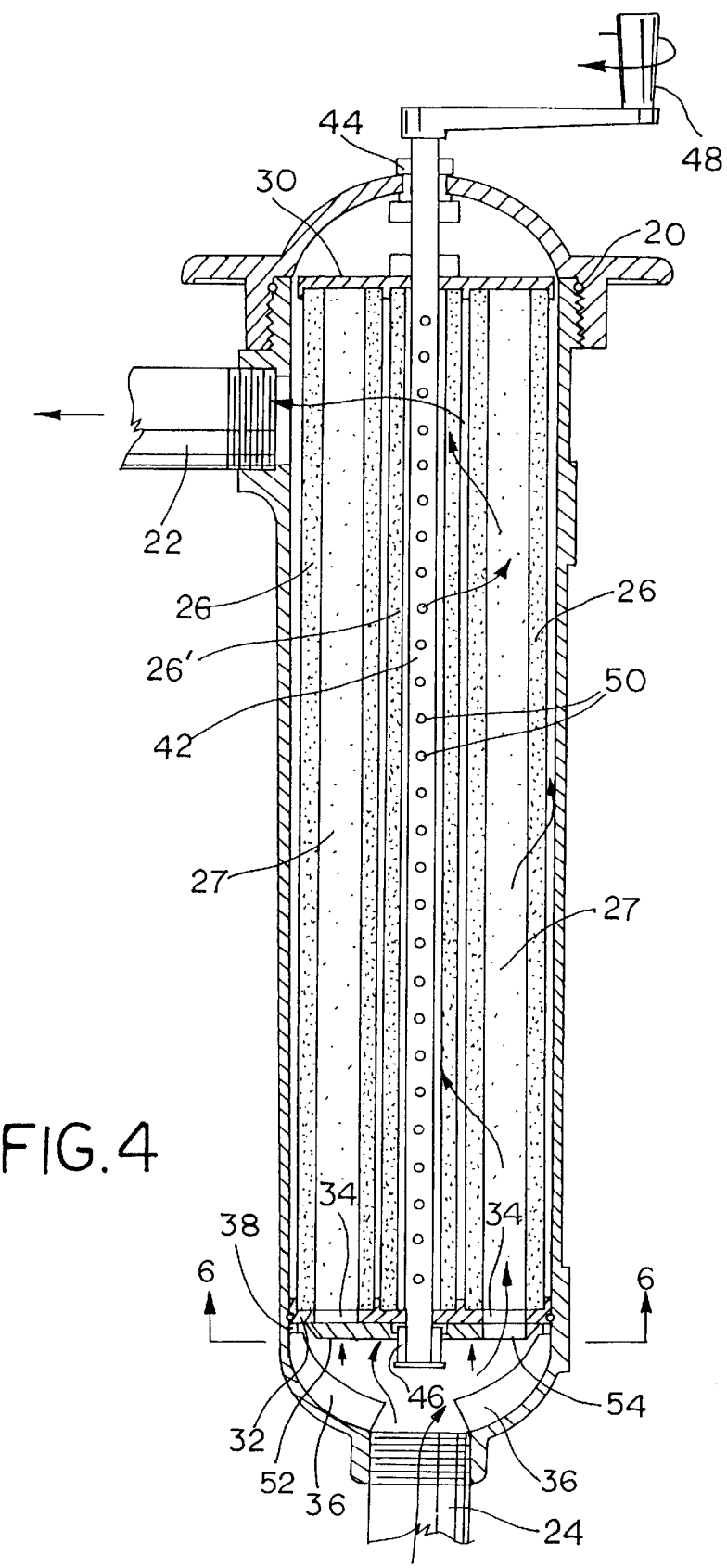
FIG. 4 is a longitudinal sectional view of the filtration device showing a liquid flow in a reverse direction through the device in its backwashing mode.

A floating plate 52 is mounted upon key 46 so as to be vertically shiftable relative to the key and shaft 42 toward and away from lower retainer plate 32. In FIG. 3 floating plate 52 is shown in its lower most position relative to the lower retainer plate and in FIG. 4 floating plate 52 is shown in its uppermost position against the lower retainer plate 32, all the while remaining in fixed driving engagement with key 46. Floating plate 52 includes a radially spaced opening 54 which is positioned so as to be alignable with each of the openings 34 in the lower retainer plate as the floating plate is rotated upon rotation of shaft 42 and connected key 46 so as to bring into sequential alignment opening 54 with each of the retainer plate openings 34 as the plate passes in rotative movement under and relative to the lower retainer plate.

Figure 9:
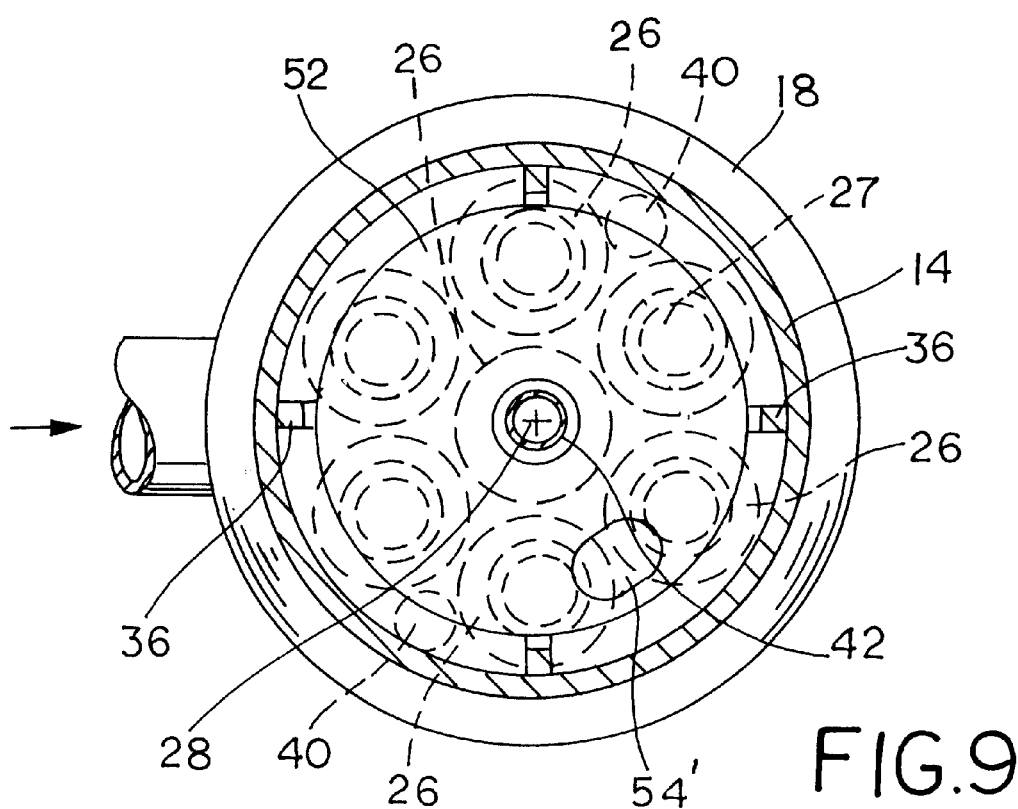
FIG. 9 is a bottom view like FIG. 5 but showing a modified opening in the floatation plate.

In FIG. 9, opening 54' of floating plate 52 is shown in elongated shape. This allows the opening 54' to be positioned longer under an aligned opening 34 in the lower retainer plate 32 to increase the flushing time for each filter cartridge 26 and to ease the turning of shaft 42.

Figure 2:
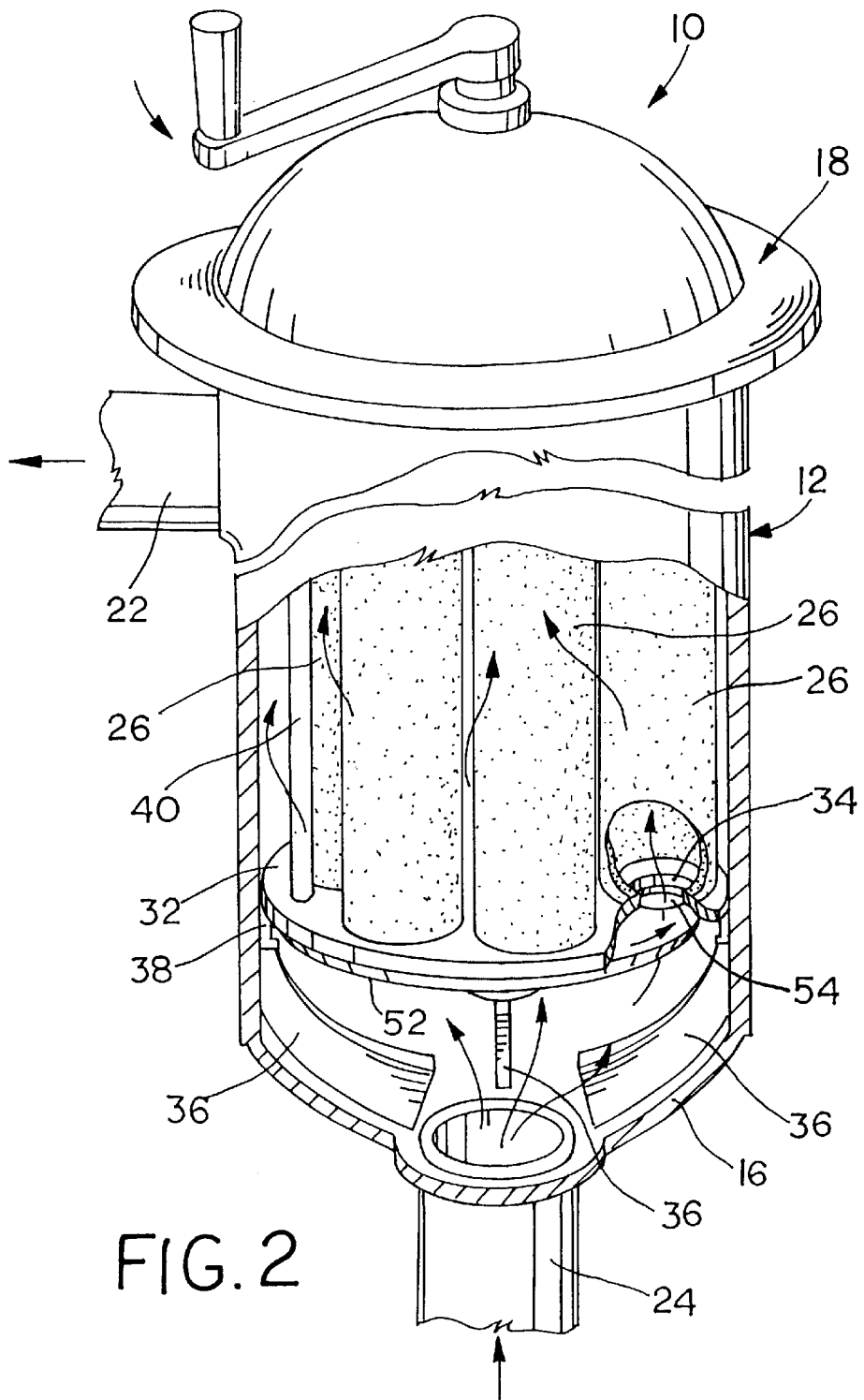
FIG. 2 is a perspective view of the filtration device with portions of the filter housing being removed for illustrative purposes and showing reverse backwashing liquid flow through the device.
Figure 7:
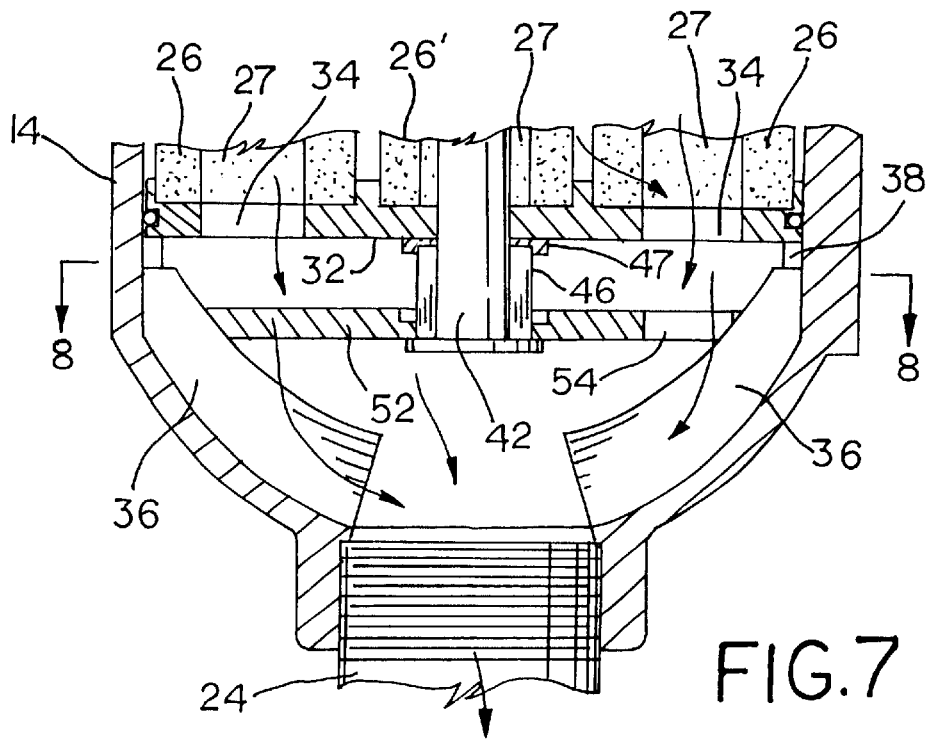
FIG. 7 is a fragmentary view shown in vertical sectional form of the lower end portion of the filtration device.
Figure 8:
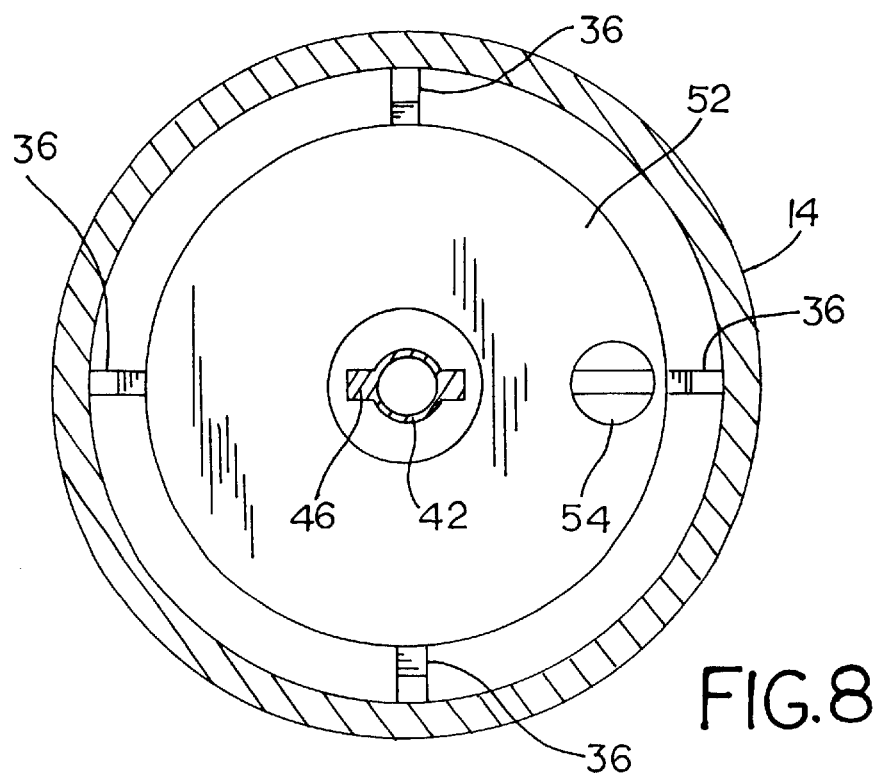
FIG. 8 is a sectional view taken along 8—8 of FIG. 7.

In normal filtering operation of filter 10, the floating plate 52 is in its lower position preferably resting upon fins 36 so as to allow uninterrupted liquid flow through the filter cartridges and aligned openings 34 in the lower retainer plate and out outlet 24 as illustrated by the flow arrows in FIGS. 1, 3, and 7. When it is desired to backwash filter 10, liquid flow through the filter is reversed as illustrated by the flow arrows in FIGS. 2 and 4, that is the liquid now first enters outlet 24 and in doing so causes floating plate 52 to be urged or driven upwardly along key 46 and against lower retainer plate 32. Handle 48 is then turned to rotate shaft 42 which in turn through key 46 causes floating plate 52 to rotate under and relative to the lower retainer plate 32. As floating plate is rotated by shaft 42, its opening 54 is sequentially aligned with each of the openings 34 in the lower retainer plate allowing a surge of backflow water into the interior or core 27 of the overlying filter cartridge 26. This sequential surging in each of the filter cartridges 26 causes water to flow reversibly through the filter to cleanse its sidewall with the dirtied backwash water exiting inlet port 22. This surging action as each opening 34 in the lower retainer plate is aligned sequentially with opening 54 of the floating plate causes a pulsation within the filter cartridges 26, assisting in their cleaning. This reverse liquid flow also passes upwardly through the interior of shaft 42, out shaft openings 50, through filter 26' and then out inlet port 22 to clean the filter.

When the backwashing operation is completed, reverse water flow is terminated with floating plate 52 dropping into its lower most position as seen in FIGS. 1, 3 and 7 thus allowing for a normal fluid flow from the inlet port 22 through the outlet port 24 of the filter. When in its lower position, floating plate 52 does not retard the normal flow through the filter due to the flow channels formed between fins 36 along bottom wall 16 of the filter housing. As such, the liquid exiting through openings 34 in the lower retainer plate flow around the lowered floating plate and between the fins in outlet 24.

Figure 5:
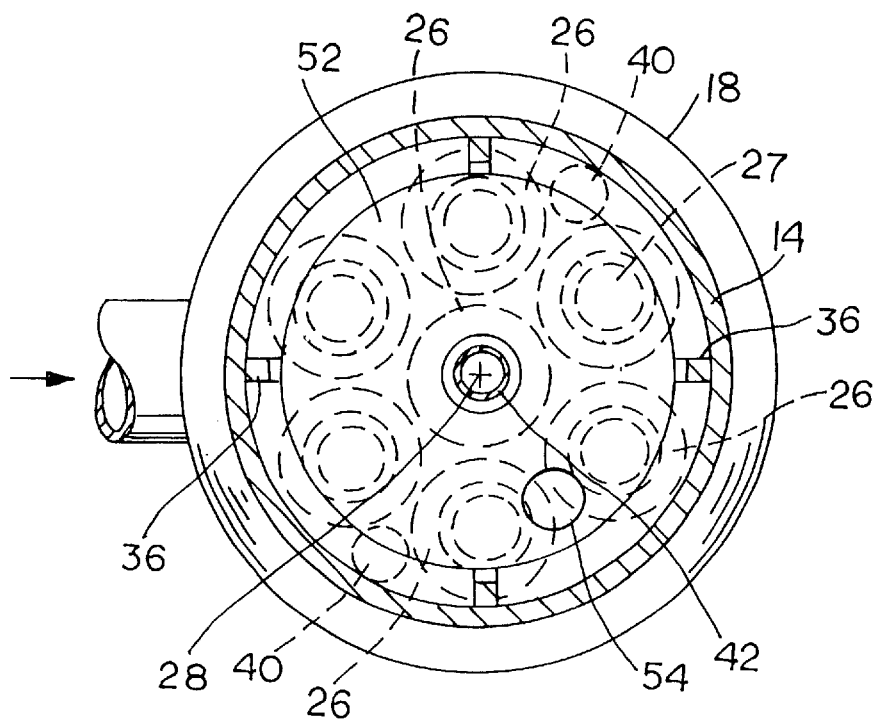
FIG. 5 is a bottom view of the filtration device showing portions of the bottom wall removed for illustrative purposes with liquid flow being illustrated in the normal filtration mode.
Figure 6:
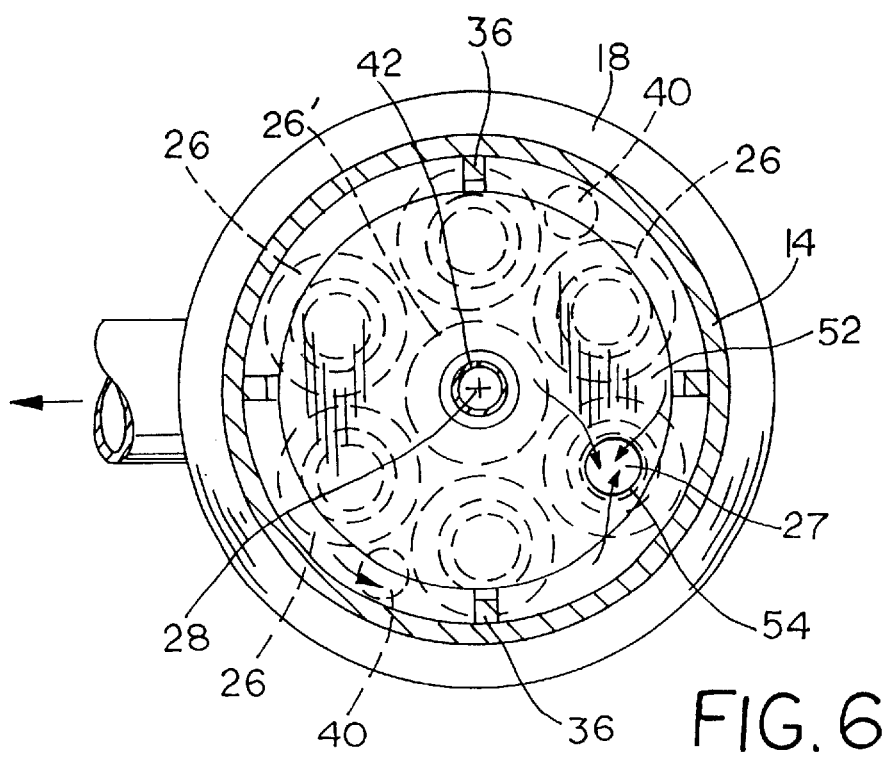
FIG. 6 is a bottom view like FIG. 5 but showing the floatation plate aligned with a filter cartridge and reverse liquid flow through the filtration device in its backwashing mode.

The pressure of the liquid during the backwashing operation is sufficiently regulated that the filter will not be over-pressurized as opening 54 in the floating plate 52 is located between openings 32 (as seen in FIG. 5) in the lower retainer plate during rotation of the floating plate against the lower retainer plate.

The invention herein described is not to be limited to the details above given but may be modified within the scope of the appended claims.

What I claims is:

1. A liquid filtration device comprising a housing having a central axis, an outlet and an inlet, a plurality of cartridge filters each having opposite ends and a central bore extending from one end to the other end thereof, said filters being arranged in a circular orientation within said housing with each filter central bore generally paralleling and being generally equal angularly spaced apart from said housing axis, a first plate extending across each filter one end and a second plate extending across each filter other end, said second plate extending between said housing inlet and outlet and having a plurality of openings therein each aligned with a said filter central bore whereby liquid entering said housing inlet passes inwardly through each of said filters and into the aligned central bore thereof and then through the aligned second plate opening and out said housing outlet, a third plate located between said second plate and said housing outlet, said third plate having an opening and being shiftable between a first position spaced from said second plate in response to said liquid flow through said housing from said inlet to the outlet thereof and a second position next to said second plate in response to liquid flow through the housing from the outlet through said third plate opening and an aligned second plate opening and filter central bore outwardly through the filter of said last mentioned aligned central bore to said housing inlet, and an activator for rotating said third plate relative to said housing and second plate when the third plate is in its second position to sequentially align said third plate opening with each second plate opening.

2. The filtration device of claim 1 wherein said activator includes a shaft extending into said housing along said housing axis and engaging said third plate for so rotating said third plate upon rotation of the shaft.

3. The filtration device of claim 2 wherein said third plate is shiftable along said shaft between its said first and second positions.

4. The filtration device of claim 3 and further comprising another said cartridge filter in addition to those said filters organized in said circular orientation positioned along said housing axis between said first and second plates, said shaft extending along said central bore of said another filter.

5. The filtration device of claim 4 wherein said shaft is of tubular form having a sidewall terminating in an open end adjacent said third plate, said shaft sidewall having openings therein, whereby said liquid flow from said housing inlet to said housing outlet includes liquid flow through said another filter into its said central bore and said shaft openings and outwardly through said shaft open end to said housing outlet when said liquid flow through the filtration device is from said inlet to outlet, said liquid flow from said housing outlet to said housing inlet includes flow into said shaft open end and out said shaft sidewall openings into said another filter central bore and outwardly through said another filter to said housing inlet.

6. The filtration device of claim 1 wherein said third plate opening is elongated in shape.

* * * * *